United States Patent Office 3,018,299
Patented Jan. 23, 1962

3,018,299
ARYL BORATE ADDITION COMPOUNDS OF AMINO HYDROCARBON SILICON COMPOUNDS
Ronald M. Pike, Chelmsford, Mass., assignor to Union Carbide Corporation, a corporation of New York
No Drawing. Filed July 1, 1960, Ser. No. 40,169
15 Claims. (Cl. 260—448.2)

This invention relates to addition compounds of triaryl borates and amino-containing silicon compounds. More particularly, this invention relates to the addition compounds of triaryl borate with amino-containing silicon compounds of the formula H₂N—R′—Si≡ wherein R′ is an alkylene group of the formula (—C_aH_{2a}—) wherein $a$ is an integer of from 3 to 18 and preferably $a$ is an integer of from 3 to 11, an arylene group or a group of the formula —(C_bH_{2b}NH—)_c—C_aH_{2a}— where $a$ is as previously defined, $b$ is an integer of from 2 to 6 and $c$ is an integer of from 1 to 4, said group being attached to silicon through the C_aH_{2a} linkage. This invention is also directed to a process for the production of such addition compounds.

The novel compounds of this invention include monomeric, polymeric and copolymeric addition compounds of a triaryl borate and an amino-containing silicon compound. These compounds are hereinafter referred to as "addition compounds."

The addition compounds of this invention which are monomeric are the silanes of the formula:

(1) 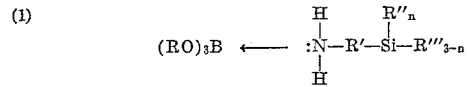

wherein R is a monovalent aryl group or a monovalent aryl group substituted with halogen, nitro, alkoxy, alkyl, cycloalkyl or aryl groups, R′ is as above defined, R″ is a monovalent hydrocarbon group, R‴ is an alkoxy group and $n$ is an integer of from 0 to 2.

The silane addition compounds of this invention which are monofunctional in regard to the silicon atom (that is where $n=2$) are, for example, tricresyl borate-gamma-aminopropyldiethoxysilane, triphenyl borate-gamma-aminopropyldiphenylpropoxysilane and the like. The silane addition compounds which are difunctional in regard to the silicon atom (that is where $n=1$) are for example, triphenyl borate-delta-aminobutylmethyldiethoxysilane, tricresyl borate-aminopropylphenyldimethoxysilane, triphenyl borate-N(beta-aminoethyl)gamma-aminopropylmethyldiethoxysilane and the like. The silane addition compounds which are trifunctional in regard to the silicon atom (that is where $n=0$) are for example, tri(orthochlorophenyl) borate-delta-aminobutyltriethoxysilane, triphenyl borate-delta-aminobutyltributoxysilane, tri(orthomethoxyphenyl) borate-gamma-aminopropyltrimethoxysilane, triphenyl borate-N(beta-aminoethyl)gamma-aminoisobutyltriethoxysilane and the like.

The addition compounds of this invention which are polymeric are the siloxanes consisting essentially of units of the formula:

(2) 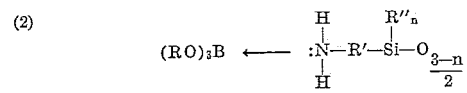

wherein R, R′, R″ and $n$ have the above-defined meanings.

The siloxane addition compounds of this invention that are trifunctional in regard to the silicon atom (that is where $n=0$) include cross-linked polysiloxanes, for example, tricresyl borate-delta-aminobutylpolysiloxane, triphenyl borate-gamma-aminopropylpolysiloxane and the like. The siloxane addition compounds of this invention which are difunctional in regard to the silicon atom (that is where $n=1$) include the linear and cyclic siloxanes. Such linear siloxanes are those containing repeating units of the formula:

(3) 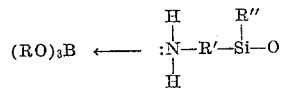

wherein R, R′ and R″ have the above-defined meanings. These linear organosiloxanes are, for example, triphenyl borate-gamma-aminopropylmethylpolysiloxane, tricresyl borate-delta-aminobutylphenylpolysiloxane

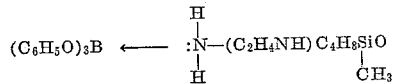

and the like. The siloxane addition compounds which are difunctional in regard to the silicon atom (that is where $n=1$) also include cyclic siloxanes of the formula:

(4) 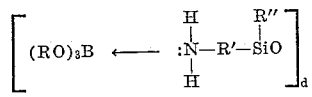

wherein R, R′ and R″ have the above-defined meanings and $d$ is an integer of from 3 to 7. These cyclic organosiloxanes are, for example, tetra-[triphenyl borate-gamma-aminopropyl]tetra-ethylcyclotetrasiloxane, penta-[tricresyl borate-delta-aminobutyl]penta-phenylcyclopentasiloxane, hepta-[tri(orthomethoxyphenyl) borate-gamma-aminopropyl]hepta-ethylcycloheptasiloxane, tri-[triphenyl borate-N-(beta-aminoethyl)gamma-aminobutyl]trimethylcyclotrisiloxane and the like. The siloxane addition compounds of this invention which are monofunctional in regard to the silicon atom (that is where $n=2$) are the dimeric siloxanes, for example, bis-triphenyl borate-gamma-aminopropyldimethyldisiloxane, bis-tricresyl borate-delta-aminobutyldiphenyldisiloxane and the like. The addition compounds of this invention also include polymeric siloxanes containing a combination of mono-, di- and trifunctional units of Formula 2.

The addition compounds of this invention also include copolymeric siloxanes consisting essentially of units of Formula 2 and units of the formula:

(5) 

wherein R″ has the above-defined meaning and $m$ is an integer of from 0 to 3. In such siloxanes, R″ can represent the same or different monovalent hydrocarbon radicals within the same molecule and $m$ and $n$ need not have the same value throughout the same molecule, that is, the copolymeric siloxane can contain mono-, di- and/or trifunctional units of Formula 2 and mono-, di-, tri- and/or tetrafunctional units of Formula 5. Thus, the copolymeric siloxane addition compounds of this invention include copolymeric linear siloxane oils, copolymeric cyclic siloxanes and copolymeric cross-linked resinous siloxanes. The compositions of this invention also exist as copolymeric difunctional siloxane gums.

Such siloxane addition compounds include organosiloxane oils having the formula:

(6) 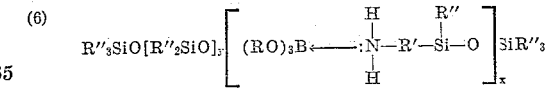

wherein R, R′ and R″ have the above-defined meanings and $x$ is an integer of at least 1 and $y$ is an integer of 0 or higher, that is, the value of $y$ can be as low as 0 or as high as 10,000 or even higher. Such organosiloxane oil addition compounds are, for example, trimethylsiloxy end-blocked dimethylsiloxane-triphenyl borate-gamma-aminopropylphenylsiloxane oils, triphenyl-siloxy end-blocked diphenylsiloxane-tricresyl borate-delta-aminobutylmethylsiloxane oils, tributylsiloxy end-blocked phenylmethylsiloxane - tri - (para-chlorophenyl) borate-omega-aminodecylmethylsiloxane - dimethylsiloxane oils, trimethylsiloxy end-blocked triphenyl borate-N-beta-aminoethyl-gamma-aminopropylmethylsiloxane-dimethyl-siloxane oils and the like.

Such cyclic siloxanes are, for example, triphenyl borate-gamma - aminopropylheptamethylcyclotetrasiloxane, tri-cresyl borate - delta-aminobutylpentaphenylcyclotrisilox-ane, tri(ortho-methoxyphenyl) borate-gamma-aminopro-pylnonamethylcyclopentasiloxane, triphenyl borate-N-beta-aminoethyl - gamma-aminopropylpentamethylcyclo-trisiloxane and the like.

(As employed herein, the symbol (←:) represents a dative or coordinate bond between the boron of the tri-aryl borate and the primary amino nitrogen of the amino-containing silicon compound.

Illustrative of the groups that R represents are aryl groups such as phenyl, tolyl, xylyl, naphthyl and the like; and substituted aryl groups. Illustrative of the groups that R can contain as substituents are the halo groups such as fluorine, chlorine, iodine and bromine; alkyl groups such as methyl, ethyl, propyl, butyl and the like; and alkoxy groups such as methoxy, ethoxy, propoxy, butoxy and the like; cycloalkyl groups such as cyclohexyl and the like; aryl groups such as phenyl, naphthyl and the like; and groups such as a nitro group. Such sub-stituted aryl groups are, for example, nitrophenyl, chloro-phenyl, methoxyphenyl, ethoxyphenyl, para-cyclohexyl-phenyl, 2-phenyl-4-chlorophenyl, ortho-phenyl and the like. The divalent hydrocarbon groups that R' can repre-sent are, for example, alkylene groups such as propylene, butylene, undecylene, octadecylene and the like, cyclo-alkylene groups such as cyclopentylene, cyclohexylene and the like; arylene groups such as phenylene, naphthyl-ene and the like. Illustrative of the groups of the formula

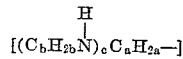

where $a$, $b$ and $c$ are as above defined, that R' repre-sents, for example,

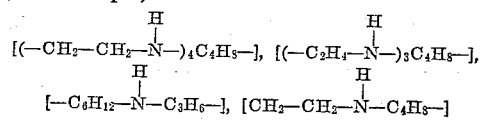

and the like. The mono-valent hydrocarbon radicals that R'' can represent are, for example, alkyl groups such as methyl, ethyl, propyl, isopropyl, undecyl, octadecyl and the like; cycloalkyl groups such as cyclopentyl, cyclo-hexyl and the like; alkenyl groups such as vinyl, allyl, butenyl and the like; aryl groups such as phenyl, naphthyl and the like; alkaryl groups such as tolyl, xylyl, ethyl-phenyl and the like; and aralkyl groups such as benzyl, phenylethyl, phenylpropyl and the like. The alkoxy groups that R''' can represent are, for example, methoxy, ethoxy, butoxy, isopropoxy, octadecyloxy and the like. Preferably, the alkoxy groups that R'' represent are the lower alkoxy groups, i.e., alkoxy groups containing from 1 to 6 carbon atoms.

In accordance with my invention, the new addition compounds are produced by the reaction of an aryl borate with an amino-containing silicon compound con-taining a primary amino nitrogen under anhydrous con-ditions. The reaction is depicted by the following equa-tion which, for the purpose of illustration, shows the reaction of triphenyl borate with gamma-aminopropyl-triethoxysilane.

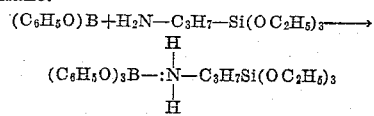

The process of this invention can be conducted by simply admixing a triaryl borate with an amino contain-ing silicon compound and maintaining the admixture at a temperature of from about 0° C. to about 200° C. whereby said triaryl borate and said amino containing silicon compound react to produce the triaryl borate-amino containing silicon addition compounds. However, in view of the fact that the reaction is usually exothermic, it is preferred to add slowly one of the reactants to the other, for example, the amino containing silicon com-pound can be added to the triaryl borate or the reverse addition can be made; that is, the addition of the triaryl borate to the amino containing silicon compound.

The relative amounts of the amino containing silicon compounds and the triaryl borate starting materials em-ployed in the process of the invention are not narrowly critical and can be varied over a wide range. The ratio of primary amino nitrogen of the amino containing silicon compound to the triaryl borate can be from 2 to 1 to 2; however, it is preferred to employ a ratio of 1 to 1. No commensurate advantage is gained by using rela-tive amounts other than those described above.

The temperature at which the reaction takes place also is not narrowly critical and can vary from as low as 0° C. to as high as 200° C. It is preferred, however, to carry out the reaction at a temperature of from about 5° C. to about 25° C.

Although the reaction can be conducted in the absence of a solvent, it is preferably carried out in a suitable solvent in which both the amino-containing silicon com-pound, the triaryl borate and the resulting addition com-pound are soluble, such solvent being non-reactive there-with. Since the reaction is exothermic a solvent is pref-erably employed. The solvent is useful in controlling the temperature of the reaction in order to avoid undesir-able side reaction such as decomposition of the reaction product. Such solvents are organic solvents, for example, the dialkyl ether and the like; cyclic ethers such as di-oxane, tetrahydrofuran and the like; aromatic hydrocar-bon solvents such as benzene, toluene, xylene and the like; aliphatic hydrocarbon solvents such as n-pentane, n-hexane, n-heptane and the like, and mixtures of aliphatic hydrocarbon solvents such as petroleum ether and ligroin. It is essential that the solvents employed be anhydrous so as to prevent undesirable side reactions such as the hydrolysis of the alkoxy groups of the silane or the hydrolysis of the aryl borates.

The amount of the solvent within which the reaction is carried out is not narrowly critical and economical amounts can be easily determined by one skilled in the art. Amounts of such solvents of from 10 parts to about 400 parts by weight of the amino containing silicon com-pound and triaryl borate starting materials can be em-ployed. It is preferred to use such solvents in amounts of from 20 parts to 100 parts by weight of the starting materials. Amounts of such solvents other than those described can be used but no commensurate advantage is gained thereby.

The amino containing silicon compounds that are use-ful as starting materials in the preparation of the addi-tion compounds of this invention are monomeric, poly-meric and copolymeric amino containing silicon com-pounds. These amino containing silicon compounds are those silicon compounds containing at least one silicon bonded unit of the formula H$_2$N—R'— and include amino-hydrocarbon-silicon compounds and N-amino-alkylaminoalkylsilicon compounds.

The monomeric amino-hydrocarbon-silicon compounds useful in preparing the compositions of this invention are the amino hydrocarbon silanes depicted by the formula:

(7)
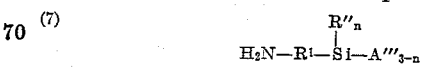

wherein R'', R''' and $n$ have the above-defined meanings, and R$^1$ is an alkylene or arylene group as defined for R'. Such amino hydrocarbon silanes, for example, are gam-ma - aminopropyltrimethoxysilane, gamma - aminopropylmethyldiethoxysilane, gamma-aminopropyldiphenylmethoxysilane, omega-aminoundecenyltriethoxysilane, para-aminophenyltriethoxysilane and the like.

The polymeric amino-hydrocarbon-silicon compounds that are useful in preparing the compositions of this invention are the amino hydrocarbon siloxanes containing units of the formula:

(8)
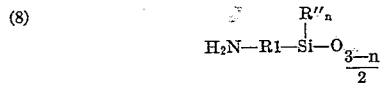

wherein $R^1$, $R''$ and $n$ have the above-defined meaning. These materials include the cyclic amino hydrocarbon siloxanes as well as linear amino hydrocarbon siloxanes as, for example, where $n$ is 1, the compounds can be in the cyclic form having from 3 to 7 such units or they can be linear having a number of such groupings. These amino hydrocarbon siloxanes can be prepared by the hydrolysis and condensation of the corresponding amino hydrocarbon alkoxysilanes. Illustrative of the cyclic amino hydrocarbon siloxanes suitable for use as a starting material are, for example, tetra-gamma-amino-propyl-tetramethylcyclotetrasiloxane, tetra-delta-aminobutyltetraphenylcyclotetrasiloxane and the like. Illustrative of the linear amino hydrocarbon siloxanes are gamma-aminopropylphenylpolysiloxane, delta-aminobutylmethylpolysiloxane, delta-aminobutylethylpolysiloxane and the like. Where $n$ is 0 in the formula, the amino hydrocarbon siloxanes are of the trifunctional variety, such as, for example, gamma-aminopropylpolysiloxane, delta-aminobutylpolysiloxane and the like. These amino hydrocarbon siloxanes can contain residual alkoxy groups in the siloxane chains or they can comprise essentially completely condensed materials.

The copolymeric amino hydrocarbon siloxanes that are useful in preparing the compositions of this invention include those copolymeric amino hydrocarbon siloxanes consisting essentially of the units:

(8)
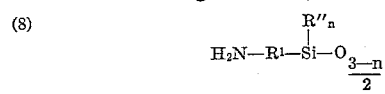

and (5)

where $R^1$, $R''$, $m$ and $n$ have the above-defined values. The copolymeric amino hydrocarbon siloxanes suitable for the preparation of the compositions of this invention include copolymeric amino hydrocarbon siloxanes containing various combined siloxane units, such as, trifunctional aminoalkylsiloxane units (where $n=0$) with difunctional hydrocarbon siloxane units (where $m=2$) and difunctional aminoarylalkylsiloxane units with trifunctional hydrocarbon siloxane units. These copolymeric amino hydrocarbon siloxanes also include other combinations of these units, such as difunctional aminoalkylsiloxane units (where $n=1$) with trifunctional hydrocarbon siloxane units (where $m=1$) and difunctional hydrocarbon units (where $m=2$) or with any combination of these units so long as it contains at least one aminosiloxane unit of any type, that is, mono-, di- or trifunctional. These copolymeric amino hydrocarbon siloxanes can be prepared by the cohydrolysis and cocondensation of the corresponding alkoxysilanes. Such copolymers can contain residual silicon-bonded alkoxy groups, or they can comprise essentially completely condensed materials.

The aminoalkylalkoxysilanes, aminoalkylpolysiloxanes as well as copolymers containing aminoalkylsilane units and hydrocarbon siloxane units can be prepared by methods known to those in the art. The aminoarylalkoxysilanes can be prepared by the reduction of nitroarylethoxysilanes at superatmospheric pressures employing hydrogen and a platinum catalyst. The nitroarylethoxysilanes are prepared by the nitration of arylchlorosilane with nitric acid in the presence of sulfuric acid and subsequently esterification of the nitroarylchlorosilane. The aminoarylsiloxane and copolymeric aminoarylsiloxane hydrocarbon siloxanes can be prepared by the hydrolysis and condensation of the aminoarylalkoxysilanes employing a basic catalyst according to techniques known to those in the art. The copolymeric aminoarylsiloxanes can be prepared by the cohydrolysis and cocondensation of the aminoarylalkoxysilanes and hydrocarbon alkoxysiloxanes employing a basic catalyst according to techniques known to those in the art.

The amino containing silicon compounds containing silicon-bonded units of the formula:

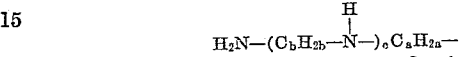

wherein $a$, $b$ and $c$ are as above defined that are useful in producing the addition compounds of this invention, include silanes, siloxanes and copolymeric siloxanes. These amino-containing silicon compounds can also be referred to as N-(aminoalkyl)aminoalkylsilicon compounds.

The N-(aminoalkyl)aminoalkylsilanes that are useful in the production of the addition compounds of this invention are those of the formula:

(9)
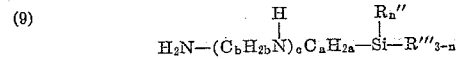

wherein $R''$, $R'''$, $a$, $b$, $c$ and $n$ are as above defined. Illustrative of the aminoalkylaminoalkylsilanes are N-(beta-aminoethyl)gamma-aminoisobutyltriethoxysilane, N-(beta-aminoethyl)gamma-aminopropylmethyldiethoxysilane, N-(beta-aminopropyl)gamma-aminoisobutyltriethoxysilane, N-(omega-aminohexyl)gamma-aminopropylphenyldiethoxysilane, $$H_2N-C_2H_4-NH-C_2H_4NHC_2H_4NHC_4H_8-\\Si-(OC_2H_5)_3$$

$$H_2N(-C_2H_4NH)_4-C_4H_8Si(CH_3)(OCH_3)_2$$

and the like. These N-aminoalkylaminoalkylsiloxanes can be prepared by the water hydrolysis and subsequent condensation of the corresponding alkoxysilanes in the presence of a basic catalyst according to techniques known to those in the art.

The N-aminoalkylaminoalkylsiloxanes that are useful in the production of the addition compounds of this invention are those composed of units of the formula:

(10)
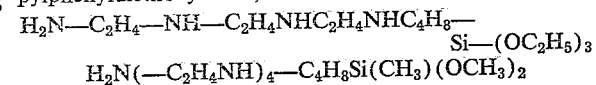

wherein $R''$, $a$, $b$, $c$ and $n$ are as above defined. These N-aminoalkylaminoalkylsiloxanes include linear, cyclic and cross-linked resinous siloxanes. The aminoalkylaminoalkylsiloxanes are, for example

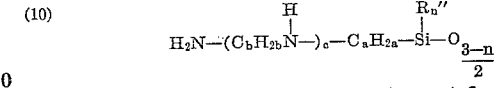

and the like.

The copolymeric N-aminoalkylaminoalkylsiloxanes are those composed essentially of units of Formula 10 and units of Formula 5. These copolymeric N-aminoalkylaminoalkylsiloxanes include copolymeric aminoalkylaminoalkylsiloxanes containing various combined siloxane units, such as, trifunctional aminoalkylaminoalkylsiloxane units (where $n=0$) with difunctional hydrocarbon siloxane units (where $m=2$), and difunctional aminoarylaminoalkylalkylsiloxane units with trifunctional hydrocarbon siloxane units. These copolymeric aminoalkylaminoalkylsiloxanes also include other combinations of these units, such as, difunctional aminoalkylaminoalkylsiloxane units (where $n=1$) with trifunctional hydrocarbon siloxane units (where $m=1$) and difunctional hydrocarbon units (where $m=2$) or with any combination of these units so long as it contains at least one aminoalkylaminoalkylsiloxane unit of any type, that is, mono-, dior trifunctional. These copolymeric aminoalkylaminoalkylsiloxanes can be prepared by the cohydrolysis and cocondensation of the corresponding alkoxysilanes. Such copolymers can contain residual silicon-bonded alkoxy groups, or they can comprise essentially completely condensed materials.

These N-aminoalkylaminoalkylsilanes can be prepared by the reaction of a chloroalkylalkoxysilane with an amino compound of the formula:

(11)
$$H_2N-(C_bH_{2b}-\overset{H}{\underset{|}{N}}-)_cH$$

where $b$ and $c$ are as above defined. The reaction is conducted by forming an equimolar mixture of the amino compound and the chloroalkylalkoxysilane and heating the mixture to the atmospheric boiling temperature of the mixture for several hours. The N-aminoalkylaminoalkylalkoxysilanes are then recovered by fractional distillation.

The triaryl borates that are useful in producing the addition compounds of this invention are those of the formula:

(12)        $(RO)_3B$ wherein R has the above-defined meaning. Illustrative of these aryl borates are, for example, triphenyl borate, tri(ortho-cresyl) borate, tri(ortho-chlorophenyl) borate, tri(beta-naphthyl) borate, tri(ortho-phenylphenyl) borate, tri(ortho-cyclohexylphenyl) borate, tri(para-cyclohexyl)-phenyl borate, tri(meta-methylphenyl) borate, tri-(2,6-dichlorophenyl) borate, tri(2,6-dimethoxyphenyl) borate, tri(ortho-nitrophenyl) borate, tri(para-tertiary butylphenyl) borate, tri(2-phenyl-4-chlorophenyl) borate, tri(para-methoxyphenyl) borate, tri(alpha-naphthyl) borate, tri(ortho-iodophenyl) borate, tri(2,4,6-trichlorophenyl) borate and the like.

The silane addition compound, the siloxane addition compounds and the copolymeric siloxane addition compounds of this invention have been found to be particularly useful as adhesives for bonding various materials together, for example, bonding rubber to glass.

EXAMPLE 1

*General procedure for the reaction of an aminoalkylsilane with an aromatic borate*

A reaction flask was flushed with nitrogen and then charged with an aromatic borate dissolved in a suitable solvent such as benzene. The flask was stoppered, the solution cooled to 0° C. by the aid of an ice bath, and an equivalent amount of the aminoalkylsilicon compound based on primary amino nitrogen added dropwise. Evidence of reaction was noted by a rise in temperature of the reaction mixture. The resulting solution was allowed to come to room temperature and was kept at room temperature from a period of two to forty-eight hours. The solvent was then removed under reduced pressure (5–10 mm. Hg) and the resulting viscous product heated at 70–80° C. (5.0 mm. Hg) for two hours.

Table I shows the ingredients used and the products obtained in a number of experiments conducted according to the above general procedure. Table II gives the elemental analysis of the product of Table I and their properties.

TABLE I
Aminoalkylsilane-aromatic borate addition compounds

| Run No. | Reactants | | Product [1] |
|---|---|---|---|
| | Borate | Aminoalkyl silicon compound | |
| 1 | Tri(ortho-chlorophenyl)borate $(Cl-C_6H_4O)_3B$ | Gamma-aminopropylmethyldiethoxysilane $H_2N-(CH_2)_3Si(CH_3)(OC_2H_5)_2$ | $(ClC_6H_4O)_3B\leftarrow\!\!\!-\!\!\!:H_2N(CH_2)_3Si(CH_3)(OC_2H_5)_2$ |
| 2 | Tri(ortho-chlorophenyl)borate | Gamma-aminopropyltriethoxysilane $H_2N(CH_2)_3Si(OC_2H_5)_3$ | $(ClC_6H_4O)_3B\leftarrow\!\!\!-\!\!\!:H_2N(CH_2)_3Si(OC_2H_5)_3$ |
| 3 | ...do... | Delta-aminobutyltriethoxysilane $H_2N(CH_2)_4Si(OC_2H_5)_3$ | $(ClC_6H_4O)_3B\leftarrow\!\!\!-\!\!\!:H_2N(CH_2)_4Si(OC_2H_5)_3$ |
| 4 | ...do... | Tetra(delta-aminobutyl)tetra-methyl-cyclotetrasiloxane. 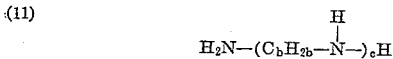 |  |
| 5 | Triphenylborate $(C_6H_5O)_3B$ | Delta-aminobutylmethyldiethoxysilane $H_2N(CH_2)_4Si(CH_3)(OC_2H_5)_2$ | $(C_6H_5O)_3B\leftarrow\!\!\!-\!\!\!:H_2N(CH_2)_4Si(CH_3)(OC_2H_5)_2$ |
| 6 | Tri(ortho-methoxyphenyl)borate $(CH_3OC_6H_4O)_3B$ | Gamma-aminopropylmethyldiethoxysilane $H_2N-(CH_2)_3Si(CH_3)(OC_2H_5)_2$ | $(CH_3OC_6H_4O)_3B\leftarrow\!\!\!-\!\!\!:H_2N(CH_2)_3Si(CH_3)(OC_2H_5)_2$ |
| 7 | Tri(ortho-methoxyphenyl)borate $(CH_3OC_6H_4O)_3B$ | Dimethyl siloxane oil having the average formula. $(CH_3)_3SiO[(CH_3)_2SiO]_{10}-$ $[H_2N(CH_2)_4Si(CH_3)O-]_{.76}Si(CH_3)_3$ | $(CH_3)_3SiO[(CH_3)_2SiO]_{10}[(CH_3OC_6H_4O)_3B\leftarrow\!\!\!-\!\!\!:H_2N-$ $(CH_2)_4Si(CH_3)O-]_{.76}Si(CH_3)_3$ |

[1] Infra-red spectra of each sample was also obtained: the results confirmed that the desired addition compounds were formed, i.e. the presence of the $B\leftarrow\!\!\!-\!\!\!:H_2N$ complex was evident.

TABLE II
Elemental analysis percent by weight

| Run No. | Calculated | | | | Found | | | | Properties |
|---|---|---|---|---|---|---|---|---|---|
| | C | H | Si | Cl | C | H | Si | Cl | |
| 1 | 53.4 | 5.65 | 4.79 | | 50.5 | 5.3 | 4.6 | | Viscous, light tan colored fluid. |
| 2 | 52.7 | 5.37 | 4.56 | | 51.7 | 5.6 | 4.5 | | Viscous, clear, reddish-brown fluid. |
| 3 | | | 4.46 | 16.9 | | | 4.7 | 16.1 | Do. |
| 4 | | | | | | | | | Viscous fluid. |
| 5 | | | 5.74 | | | | 6.0 | | Viscous, clear, reddish-brown fluid. |
| 6 | 65.9 | 7.95 | 5.31 | | 66.8 | 7.9 | 5.3 | | Viscous, light tan fluid. |
| 7 | | | | | | | | | Viscous, clear, light tan fluid having a viscosity higher than the viscosity of the starting silicone oil. |

EXAMPLE 2

General procedure for use of the addition compounds to adhesive

A thin layer of the aminoalkylsilicon compound-aryl borate addition compound was spread on the substrate; the material to be bonded was then placed on this area. A clamp was then applied to hold the materials firmly against each other, and the sample placed in an oven at a temperature of 80–110° C. for a period of eight hours. The following table gives the results of employing the various aminoalkylsilicon compound-aryl borate addition compounds as adhesives for various materials.

TABLE III

Use of aminoalkylsilicon aryl borate addition compounds as adhesives

| Product of Run No. of Table I | Material bonded | Substrate | Remarks |
|---|---|---|---|
| 1 | Rubber | Glass | Good adhesion. |
| 3 | do | do | Do. |
| 1 | do | Asbestos | Do. |
| 1 | do | Stainless steel | Do. |

When tri(ortho-chlorophenyl)borate alone was employed in an attempt to bond glass and rubber, poor adhesion was obtained.

EXAMPLE 3

Para-aminophenyltriethoxysilane is reacted with triphenyl borate according to the procedure of Example 1 to produce a triphenyl borate-para-aminophenyltriethoxysilane addition compound.

EXAMPLE 4

N - (beta - aminoethyl)gammaaminoisobutylmethyldiethoxysilane is reacted with tri(orthophenylphenyl) borate according to the procedure of Example 1 to produce an addition compound of the formula:

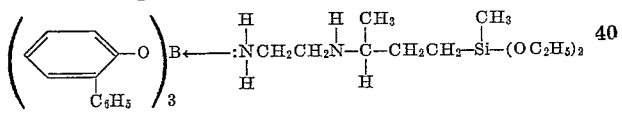

EXAMPLE 5

Tri(orthochlorophenyl) borate is reacted with an aminoalkylsilicon compound of the formula:

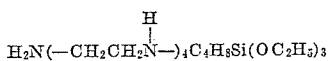

according to the procedure of Example 1 to produce an addition compound of the formula:

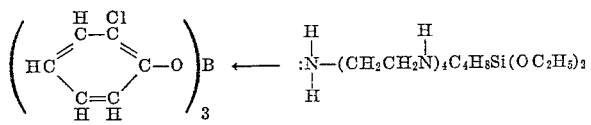

What is claimed is:
1. A triaryl borate amino hydrocarbon silicon compound selected from the class consisting of:
(1) silanes of the formula:

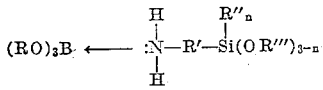

wherein R is a member of the class consisting of aryl groups and aryl groups substituted with a member of the class consisting of halogen, nitro, alkyl, cycloalkyl, aryl and alkoxy groups, R' is a divalent group selected from the class consisting of arylene groups, alkylene groups of the formula —$C_aH_{2a}$— wherein $a$ is an integer of from 3 to 18 and groups of the formula

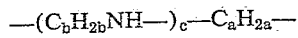

wherein $a$ is as above defined, $b$ is an integer of from 2 to 6 and $c$ is an integer of from 1 to 4, R" is a monovalent hydrocarbon radical, R''' is an alkyl group and $n$ is an integer of from 0 to 2.

(2) siloxanes consisting essentially of units of the formula:

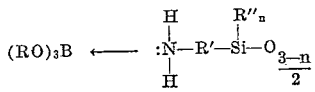

wherein R, R', R" and $n$ have the above-defined meanings, and (3) copolymeric siloxanes consisting essentially of the units as defined in (2) and units of the formula:

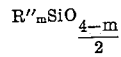

wherein R" is as above defined and $m$ is an integer of from 0 to 3.

2. A silane of the formula:

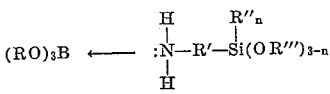

wherein R is a member of the class consisting of aryl groups and aryl groups substituted with a member of the class consisting of halogen, nitro, alkyl, cycloalkyl, aryl and alkoxy groups, R' is a divalent group selected from the class consisting of arylene groups, alkylene groups of the formula —$C_aH_{2a}$— wherein $a$ is an integer of from 3 to 18 and groups of the formula

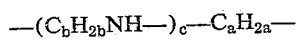

wherein $a$ is as above defined, $b$ is an integer of from 2 to 6 and $c$ is an integer of from 1 to 4, R" is a monovalent hydrocarbon radical, R''' is an alkyl group and $n$ is an integer of from 0 to 2.

3. A siloxane consisting essentially of units of the formula:

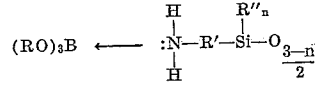

wherein R is a member of the class consisting of aryl groups and aryl groups substituted with a member of the class consisting of halogen, nitro, alkyl, cycloalkyl, aryl and alkoxy groups, R' is a divalent group selected from the class consisting of arylene groups, alkylene groups of the formula —$C_aH_{2a}$— wherein $a$ is an integer of from 3 to 18 and groups of the formula

wherein $a$ is as above defined, $b$ is an integer of from 2 to 6 and $c$ is an integer of from 1 to 4, R" is a monovalent hydrocarbon radical, and $n$ is an integer of from 0 to 2.

4. A cyclic siloxane of the formula:

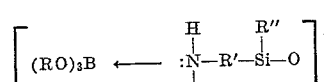

wherein R is a member of the class consisting of aryl groups and aryl groups substituted with a member of the class consisting of halogen, nitro, alkyl, cycloalkyl, aryl and alkoxy groups, R' is a divalent group selected from the class consisting of arylene groups, alkylene groups of the formula —$C_aH_{2a}$— wherein $a$ is an integer of from 3 to 18 and groups of the formula

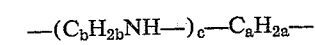

wherein $a$ is as above defined, $b$ is an integer of from 2 to 6 and $c$ is an integer of from 1 to 4, R" is a monovalent hydrocarbon radical and $d$ is an integer of from 3 to 7.

5. Copolymeric organosiloxane consisting essentially of units of the formula:

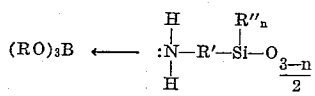

and units of the formula:

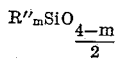

wherein R is a member of the class consisting of aryl groups and aryl groups substituted with a member of the class consisting of halogen, nitro, alkyl, cycloalkyl, aryl and alkoxy groups, R' is a divalent group selected from the class consisting of arylene groups, alkylene groups of the formula $-C_aH_{2a}-$ wherein $a$ is an integer of from 3 to 18 and groups of the formula $$-(C_bH_{2b}NH-)_c-C_aH_{2a}-$$

wherein $a$ is as above defined, $b$ is an integer of from 2 to 6 and $c$ is an integer of from 1 to 4, R" is a monovalent hydrocarbon radical, $n$ is an integer of from 0 to 2 and $m$ is an integer of from 0 to 3.

6. A copolymeric siloxane of the formula:

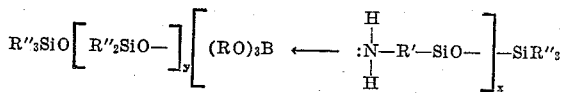

wherein R is a member of the class consisting of aryl groups and aryl groups substituted with a member of the class consisting of halogen, nitro, alkyl, cycloalkyl, aryl and alkoxy groups, R' is a divalent group selected from the class consisting of arylene groups, alkylene groups of the formula $-C_aH_{2a}-$ wherein $a$ is an integer of from 3 to 18 and groups of the formula $$-(C_bH_{2b}NH-)_c-C_aH_{2a}-$$

wherein $a$ is as above defined, $b$ is an integer of from 2 to 6 and $c$ is an integer of from 1 to 4, R" is a monovalent hydrocarbon radical, $x$ is an integer of at least 1 and $y$ is an integer.

7. A silane of the formula:

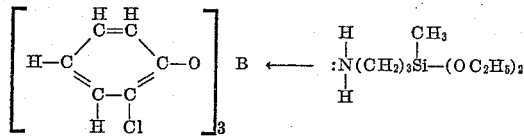

8. A silane of the foromula:

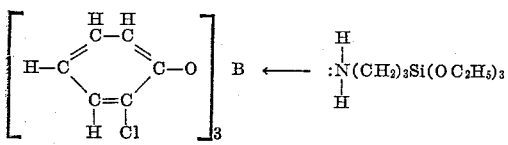

9. A silane of the formula:

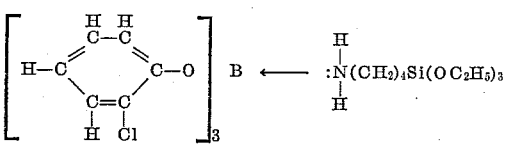

10. A silane of the formula:

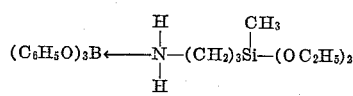

11. A silane of the formula:

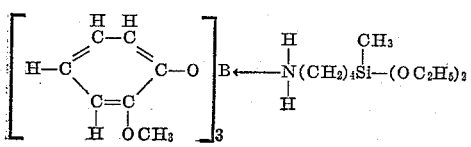

12. A siloxane of the formula:

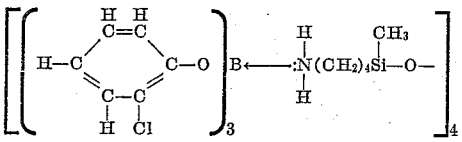

13. A process for the production of a triaryl borate amino hydrocarbon silicon compound selected from the class consisting of:

(1) silanes of the formula:

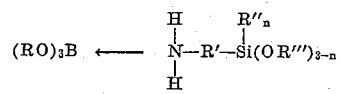

wherein R is a member of the class consisting of aryl groups and aryl groups substituted with a member of the class consisting of halogen, nitro, alkyl, cycloalkyl, aryl and alkoxy groups, R' is a divalent group selected from the class consisting of arylene groups, alkylene groups of the formula $-C_aH_{2a}-$ wherein $a$ is an integer of from 3 to 18 and groups of the formula $$-(C_bH_{2c}NH-)_c-C_aH_{2a}-$$

wherein $a$ is as above defined, $b$ is an integer of from 2 to 6 and $c$ is an integer of from 1 to 4, R" is a monovalent hydrocarbon radical, R''' is an alkyl group and $n$ is an integer of from 0 to 2.

(2) siloxanes consisting essentially of units of the formula:

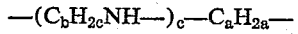

wherein R, R', R" and $n$ have the above-defined meanings, and (3) copolymeric siloxanes consisting essentially of the units as defined in (2) and units of the formula:

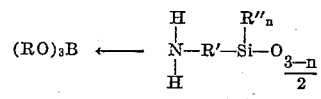

wherein R" is as above defined and $m$ is an integer of from 0 to 3, which comprises forming a mixture of (I) an amino hydrocarbon silicon compound selected from the group consisting of:

(a) aminosilanes of the formula:

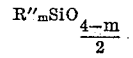

wherein R', R", R''' and $n$ are as above defined, (b) polymeric aminosiloxanes consisting of units of the formula:

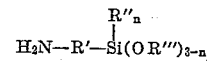

wherein R', R" and $n$ are as above defined, and (c) copolymeric aminosiloxanes consisting essentially of units as defined in (b) and units of the formula:

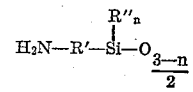

wherein R" and $m$ are as above defined and (II) a triaryl borate of the formula:

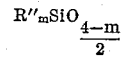

wherein R is as above defined, maintaining said mixture at a temperature at which said aminosilicon compound and said triaryl borate react to produce said triaryl borate aminosilicon compound.

14. A process as defined in claim 13, wherein the process is conducted in the presence of an inert organic solvent.

15. An adhesive consisting essentially of a triaryl borate amino hydrocarbon silicon compound selected from the class consisting of:

(1) silanes of the formula:

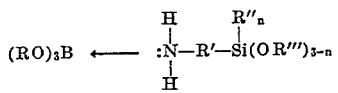

wherein R is a member of the class consisting of aryl groups and aryl groups substituted with a member of the class consisting of halogen, nitro, alkyl, cycloalkyl, aryl and alkoxy groups, R' is a divalent group selected from the class consisting of arylene groups, alkylene groups of the formula —$C_aH_{2a}$— wherein $a$ is an integer of from 3 to 18 and groups of the formula

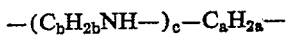

wherein $a$ is as above defined, $b$ is an integer of from 2 to 6 and $c$ is an integer of from 1 to 4, R" is a monovalent hydrocarbon radical, R''' is an alkyl group and $n$ is an integer of from 0 to 2.

(2) siloxanes consisting essentially of units of the formula:

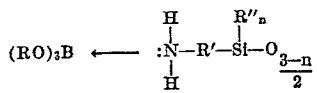

wherein R, R', R" and $n$ have the above-defined meanings, and (3) copolymeric siloxanes consisting essentially of the units as defined in (2) and units of the formula:

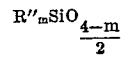

wherein R" is as above defined and $m$ is an integer of from 0 to 3.

References Cited in the file of this patent
FOREIGN PATENTS
1,184,199 France _____ Feb. 2, 1959

UNITED STATES PATENT OFFICE
CERTIFICATION OF CORRECTION

Patent No. 3,018,299            January 23, 1962

Ronald M. Pike

It is hereby certified that error appears in the above numbered patent requiring correction and that the said Letters Patent should read as corrected below.

Column 1, line 43, for "aminopropyldiethoxysilane" read -- aminopropyldimethylethoxysilane --; column 3, lines 70 and 73, for the radical "-$C_3H_7$-", each occurrence, read -- -$C_3H_6$- --; column 4, line 19, after "1 to", first occurrence, insert -- 1 to --; line 70, in the formula (7) the radical "A'''" read -- R''' --; column 6, line 57, in the formula the radical, "-$C_3H_7$-" read -- -$C_3H_6$- --; column 11, line 26, in the right-hand bracket of the formula, the radical "-SiO-" read -- R''
    |
  -SiO- --; column 11, line 66, (claim 10), column 11, line 73, (claim 11), column 12, line 13, (claim 13), in the first formula, and same column 12, line 33, (claim 13), in the third formula, insert a colon next to "N", each occurrence, so that the formula will show a ------- -- bond.

Signed and sealed this 23rd day of October 1962.

(SEAL)
Attest:

ERNEST W. SWIDER
Attesting Officer

DAVID L. LADD
Commissioner of Patents